US008416642B2

(12) United States Patent
Choi et al.

(10) Patent No.: US 8,416,642 B2
(45) Date of Patent: Apr. 9, 2013

(54) SIGNAL PROCESSING APPARATUS AND METHOD FOR REMOVING REFLECTED WAVE GENERATED BY ROBOT PLATFORM

(75) Inventors: JongSuk Choi, Seoul (KR); Munsang Kim, Seoul (KR); Youngin Park, Seoul (KR); Sangmoon Lee, Daegu (KR)

(73) Assignee: Korea Institute of Science and Technology, Seoul (KR)

( * ) Notice: Subject to any disclaimer, the term of this patent is extended or adjusted under 35 U.S.C. 154(b) by 288 days.

(21) Appl. No.: 12/765,428

(22) Filed: Apr. 22, 2010

(65) Prior Publication Data

US 2011/0128821 A1    Jun. 2, 2011

(30) Foreign Application Priority Data

Nov. 30, 2009    (KR) ........................ 10-2009-0116696

(51) Int. Cl.
    *G01S 3/80*           (2006.01)
(52) U.S. Cl. ........................................................ 367/118
(58) Field of Classification Search ................... 367/118
    See application file for complete search history.

(56) References Cited

U.S. PATENT DOCUMENTS

| | | | |
|---|---|---|---|
| 6,393,392 B1* | 5/2002 | Minde | 704/220 |
| 7,587,056 B2 | 9/2009 | Zhang | |
| 2004/0120482 A1* | 6/2004 | Bentley et al. | 379/93.01 |
| 2005/0180579 A1* | 8/2005 | Baumgarte et al. | 381/63 |
| 2005/0220043 A1* | 10/2005 | Handel et al. | 370/286 |
| 2006/0203946 A1* | 9/2006 | Moch et al. | 375/349 |
| 2007/0127711 A1* | 6/2007 | LeBlanc | 379/406.16 |
| 2008/0069374 A1* | 3/2008 | Zhang | 381/94.1 |
| 2008/0298602 A1 | 12/2008 | Wolff et al. | |
| 2011/0129105 A1* | 6/2011 | Choi et al. | 381/313 |

FOREIGN PATENT DOCUMENTS

| | | |
|---|---|---|
| JP | 2009-42754 A | 2/2009 |
| KR | 10-2005-0005868 | 1/2005 |
| KR | 10-2006-0076486 A | 7/2006 |
| KR | 10-2006-0111167 A | 10/2006 |
| KR | 10-2008-0038216 A | 5/2008 |
| KR | 10-2009-0017211 A | 2/2009 |
| KR | 10-2009-0033716 A | 4/2009 |
| KR | 10-2009-0066726 A | 6/2009 |

* cited by examiner

*Primary Examiner* — Isam Alsomiri
*Assistant Examiner* — James Hulka
(74) *Attorney, Agent, or Firm* — Dickstein Shapiro LLP

(57) ABSTRACT

Disclosed herein is a signal processing apparatus and method for removing a reflected wave generated by a robot platform. The signal processing apparatus includes a transfer function measuring unit for measuring an inter-channel transfer function (IcTF) from signals of a plurality of channels; an impulse response obtaining unit for obtaining an inter-channel impulse response (IcIR) from the IcTF measured by the transfer function measuring unit; and reflected wave removing unit for removing the reflected wave by differentiating a direct wave directly generated by a sound source and the reflected wave with a time delay from the IcIR obtained by the impulse response obtaining unit. The signal processing method of removing a reflected wave includes measuring an IcTF from signals of a plurality of channels; obtaining an IcIR from the measured IcTF; and removing the reflected wave by differentiating a direct wave directly generated by a sound source and a the reflected wave with a time delay from the obtained IcIR.

6 Claims, 5 Drawing Sheets

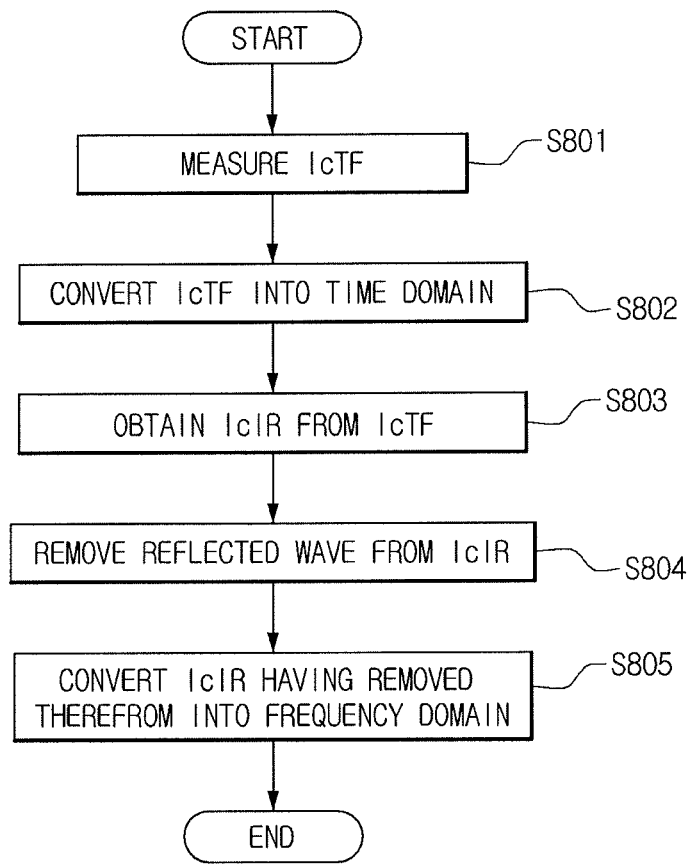

SIGNAL PROCESSING APPARATUS AND METHOD FOR REMOVING REFLECTED WAVE GENERATED BY ROBOT PLATFORM

CROSS-REFERENCE TO RELATED APPLICATION

This application claims priority from and the benefit of Korean Patent Application No. 10-2009-116696, filed on Nov. 30, 2009, which is hereby incorporated by reference for all purposes as if fully set forth herein.

BACKGROUND

1. Field of the Invention

Disclosed herein is a signal processing apparatus and method for removing a reflected wave generated by a robot platform.

2. Description of the Related Art

Recently, much interest has been focused on industries for intelligent robots that can interact with human beings. It is important that a robot detect the exact position of a robot user who is a conversational partner for Human-Robot Interaction (HRI). Therefore, a technique for detecting the direction of a sound source using an acoustic sensor is one of essential techniques for HRI.

The related art technique for detecting the direction of a sound source includes a method using Time Delay Of Arrivals (TDOA), a method using a Head-Related Transfer Function (HRTF) database of a robot platform, a beamforming method using a plurality of microphone arrays, and the like.

The method using the TDOA is a method for estimating the direction of a sound source using a delay time at which a sound of a speaker arrives at each sensor. Since the method has a simple algorithm and a small amount of calculation, it is frequently used for estimating the position of a sound source in real time. However, when there is a constraint that a microphone should be disposed in a narrow area such as each user's ear, i.e., when the distance between the microphones is shortened, the method is disadvantageous in that estimation resolution is reduced. When only two microphones are used in a narrow area, a sound source has the same delay time at two positions on a two-dimensional plane, and therefore, front-back confusion occurs. That is, if the position of a sound source is estimated based on only the delay time difference when only the two microphones are used, front-back discrimination is impossible.

The method using the HRTF is a method for detecting the direction of a sound source using information on the magnitude and phase of an HRTF. The method is similar to the sound source direction detecting method of human beings, but a change in transfer function, caused by an external ear, is shown in frequency domain higher than the sound frequency area (~4 kHz). Therefore, the method is disadvantageous in that a relatively large-sized artificial ear is necessarily used and the amount of database for sound source direction detection is increased.

The beamforming method is a method for matching a vector of a virtual sound source to a position vector of a real sound source while rotating the vector of the virtual sound source. In the beamforming method, an array having a plurality of fixed sensors is necessarily used. When a plurality of microphones are used, a high-end hardware for signal processing is required, and the amount of data to be processed is increased. Therefore, the beamforming method is disadvantageous in that it is unsuitable for detecting the direction of a sound source in real time.

Artificial ears manufactured using the related art techniques are influenced by a robot platform, i.e., reflected microwaves measured from a microphone used in sound source direction detection, and therefore, it is difficult to detect the exact direction of a sound source. Generally, the auditory structure of a robot has a shape suitable for the shape of a robot platform. However, when a new robot is developed, a robot acoustic system for eliminating the influence of reflected waves is necessarily developed accordingly.

SUMMARY OF THE INVENTION

Disclosed herein is a signal processing apparatus and method for removing a reflected wave generated by a robot platform, in which a reflected wave is removed by differentiating a direct wave directly generated from a sound source and the reflected wave with a time delay from each other, so that a sound source direction detecting technique can be freely applied to various robot platforms.

In one embodiment, there is a signal processing apparatus for removing a reflected wave generated by a robot platform, which includes a transfer function measuring unit for measuring an inter-channel transfer function (IcTF) from signals of a plurality of channels; an impulse response obtaining unit for obtaining an inter-channel impulse response (IcIR) from the IcTF measured by the transfer function measuring unit; and reflected wave removing unit for removing the reflected wave by differentiating a direct wave directly generated by a sound source and the reflected wave with a time delay from the IcIR obtained by the impulse response obtaining unit.

The signal processing apparatus may further include a time domain converting unit for converting the IcTF measured by the transfer function measuring unit into time domain; and a frequency domain converting unit for converting the IcIR having the reflected wave removed from the reflected wave removing unit into frequency domain.

In one embodiment, there is provided a signal processing method for removing a reflected wave generated by a robot platform, which includes measuring an IcTF from signals of a plurality of channels; obtaining an IcIR from the measured IcTF; and removing the reflected wave by differentiating a direct wave directly generated by a sound source and a reflected wave with a time delay from the obtained IcIR.

The signal processing method may further include converting the IcTF measured in the measuring of the IcTF into time domain; and converting the IcIR having the reflected wave removed in the removing of the reflected wave into frequency domain.

BRIEF DESCRIPTION OF THE DRAWINGS

The above and other aspects, features and advantages of the present invention will become apparent from the following description of preferred embodiments given in conjunction with the accompanying drawings, in which:

FIG. 8 is a flowchart illustrating the signal processing method for removing a reflected wave generated by a robot platform according to an embodiment of the invention.

DETAILED DESCRIPTION OF THE INVENTION

Figure 1:
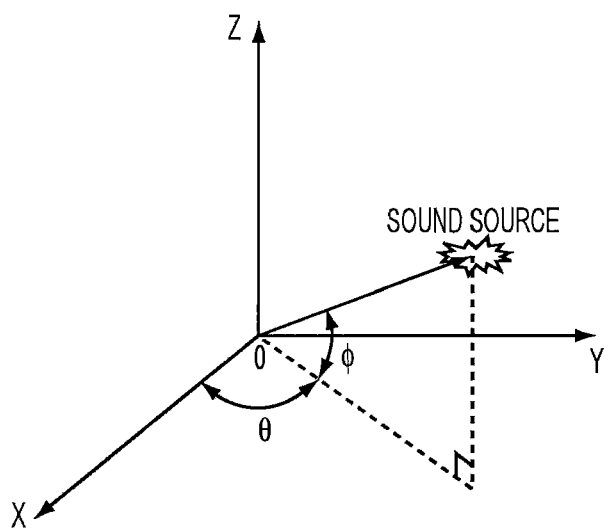
FIG. 1 is a view showing vertical-polar coordinates.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

FIG. 1 is a view showing vertical-polar coordinates. If it is assumed that an artificial ear according to an embodiment of the invention is raised from the ground, the elevation angle $\phi$ of a sound source that exists on a center plane with a horizontal angle $\theta$ of zero degree, i.e., a two-dimensional plane, may be estimated using the structure of the artificial ear.

Figure 2A:
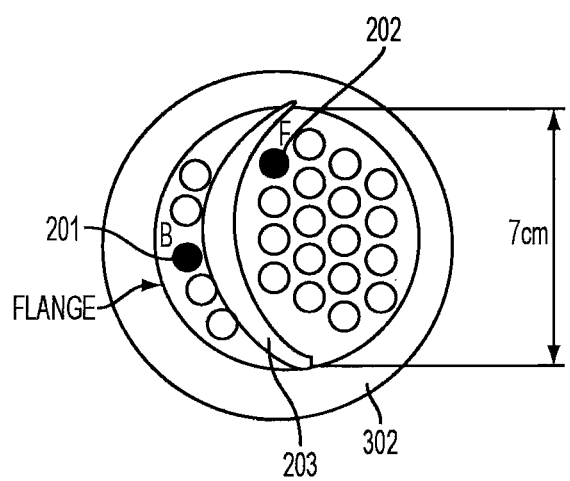
FIGS. 2A and 2B are views showing an artificial ear for detecting the direction of a sound source according to an embodiment of the invention.
Figure 2B:
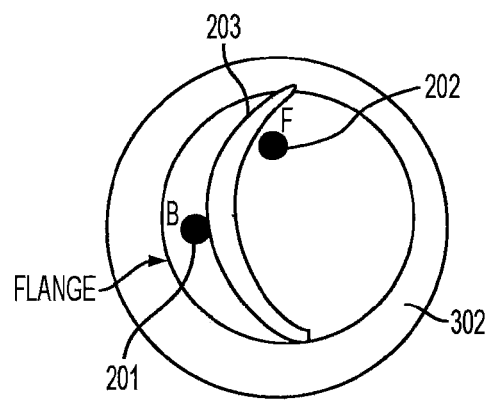

FIGS. 2A and 2B are views showing an artificial ear for detecting the direction of a sound source according to an embodiment of the invention. The artificial ear includes two microphones 201 and 202 having different channels from each other and a structure 203 disposed between the two microphones 201 and 202. The structure 203 may induce a difference between output signals that are radiated from a sound source for detecting its direction and respectively inputted to the two microphones 201 and 202.

According to an embodiment of the invention, the structure 203 may be designed to have a shape similar to an earflap in a person's ear, and is hereinafter referred to as an earflap. The difference between output signals respectively inputted to the two microphones 201 and 202 is induced by the structure 203, and accordingly, the front-back differentiation of the direction of a sound source can be accomplished. Based on such an idea, an artificial ear is manufactured so that an earflap model with a length of 7 cm and microphones can be attached thereto, which is shown in FIG. 2A. In order to select the optimal positions of the microphones, a plurality of holes are formed in the artificial ear so that an experiment using a plurality of microphones can be performed. The optimal positions of the microphones selected finally are shown in FIG. 2B.

The artificial ear shown in FIGS. 2A and 2B is provided only for illustrative purposes, and may be variously implemented based on the number or arrangement of microphones and structures.

Figure 3:
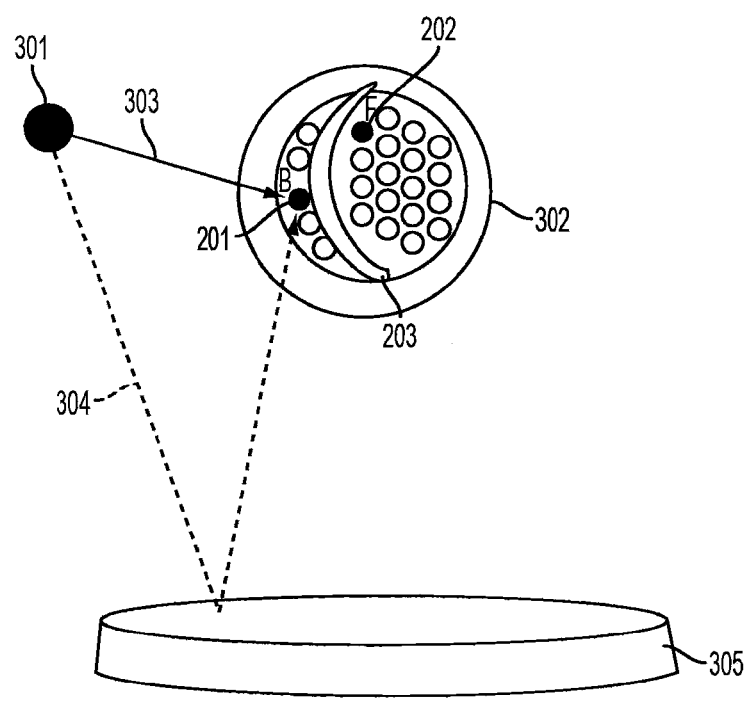
FIG. 3 is a view illustrating a path through which a direct wave generated by a sound source and a reflected wave generated by a robot platform arrive at a microphone disposed in a robot artificial ear.

FIG. 3 is a view illustrating a path through which a reflected wave generated by a robot platform arrives at a microphone disposed in a robot artificial ear. In an environment that satisfies a free field condition (an environment with no physical factor that reflection is caused by a radiated sound), reflected waves 304 are not generated, and when the direction of a sound source 301 is detected, only direct waves 303 of radiated sounds arrives at two microphones attached to an artificial ear 302, respectively. However, a humanoid robot has a certain shape similar to a person, e.g., the shape of a platform 305 with a head, shoulders, arms, legs and the like. For this reason, unlike the environment that satisfies the free field condition, in an environment in which the humanoid robot is actually used, acoustic waves (reflected waves) 304 reflected from the robot platform 305 and an ambient environment (a bottom, a wall and the like) are also transferred to the respective microphones attached to the artificial ear, in addition to direct waves 303. This is schematically illustrated in FIG. 3. When the direct wave 303 generated by the sound source 301 and the reflected wave 304 generated by the robot platform 305 are measured together by the microphone, an inter-channel transfer function (IcTF) used for detecting the direction of a real sound source 301 is defined by Equation 1.

$$IcTF_{FB}(f_k) = \frac{G_{FB}(f_k)}{G_{BB}(f_k)} = |IcTF(f_k)|e^{j \cdot phase(f_k)} \quad (1)$$

Here, $G_{FB}(f_k)$ denotes a cross power density function between the signals of the first and second channels, and $G_{BB}(f_k)$ denotes a power spectral density function of the signal of the second channel.

Figure 4:
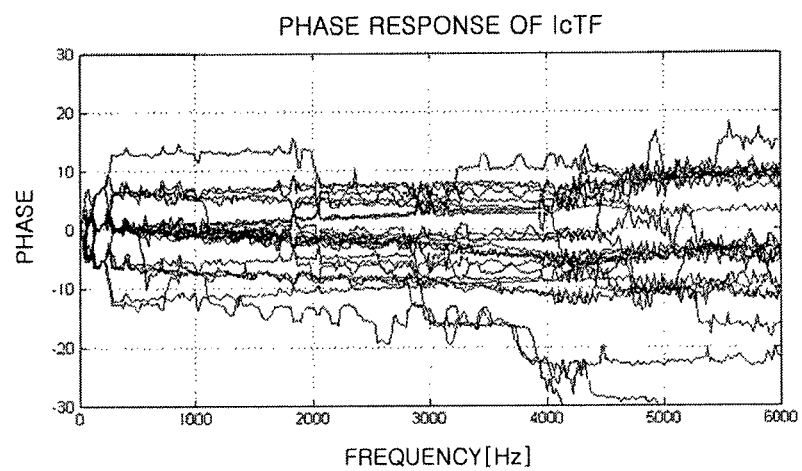
FIG. 4 is a graph showing phase information of an inter-channel transfer function (IcTF) of a signal including direct and reflected waves.

FIG. 4 is a graph showing phase information of an IcTF of a signal including direct and reflected waves. In order to detect the direction of a sound source, the most ideal estimation performance is theoretically shown when linear phase information is used. However, as shown in FIG. 4, there is a limitation in using phase information measured in the sound source direction detection, and it is necessary to linearize the phase response. Therefore, when the IcTF is converted into time domain and then observed using an inter-channel impulse response (IcIR), it can be seen that acoustic waves reflected from the robot platform and the ambient environment (the bottom, the wall and the like) are included in the IcTF.

Figure 5:
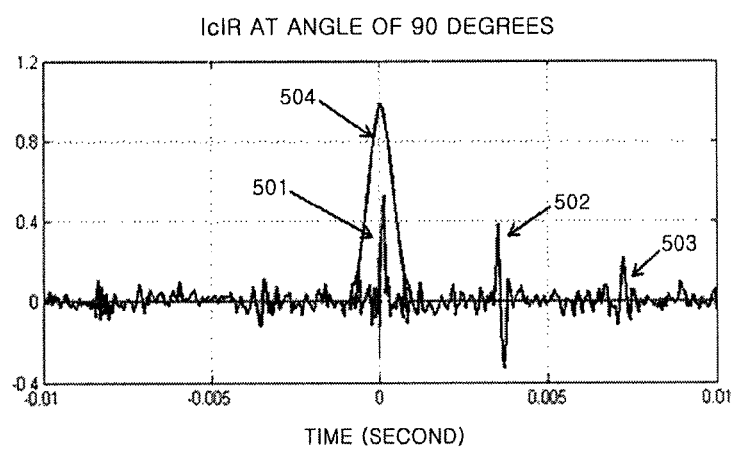
FIG. 5 is a graph illustrating a signal processing method for removing a reflected wave generated by a robot platform using Hamming windowing according to an embodiment of the invention.

FIG. 5 is a graph illustrating a signal processing method for removing a reflected wave generated by a robot platform using Hamming windowing according to an embodiment of the invention. Referring to FIG. 5, in the environment in which the humanoid robot is actually used, an acoustic signal may include a reflected wave 502 generated by the robot platform, a reflected wave 503 generated by the ambient environment and the like, in addition to a direct wave 501. The object of using the signal processing method for removing the reflected wave is to extract only the effect influenced by the direct wave 501. Therefore, second and third peaks that respectively show the reflected wave 502 generated by the robot platform and the reflected wave 503 generated by the ambient environment are necessarily removed. That is, as illustrated in FIG. 5, windowing is performed by applying the IcTF to the IcIR converted into the time domain using a Hamming window 504, so that it is possible to remove influence due to the reflected waves 502 and 503.

Figure 6:
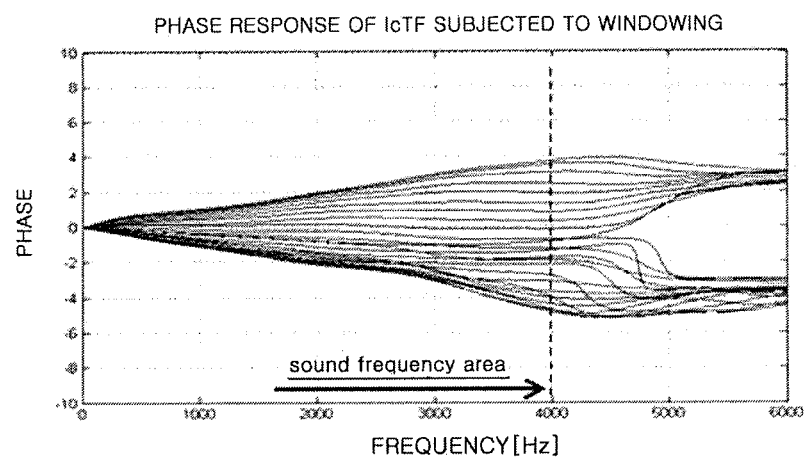
FIG. 6 is a graph showing phase information of an IcTF of a signal having a reflected wave removed therefrom according to an embodiment of the invention.

As such, a windowed IcTF can be obtained by converting the windowed IcIR into frequency domain, and phase information of the windowed IcTF is shown in FIG. 6. Referring to FIG. 6, it can be seen that the phase information is remarkably linearized as compared with the phase information shown in FIG. 4.

Figure 7:
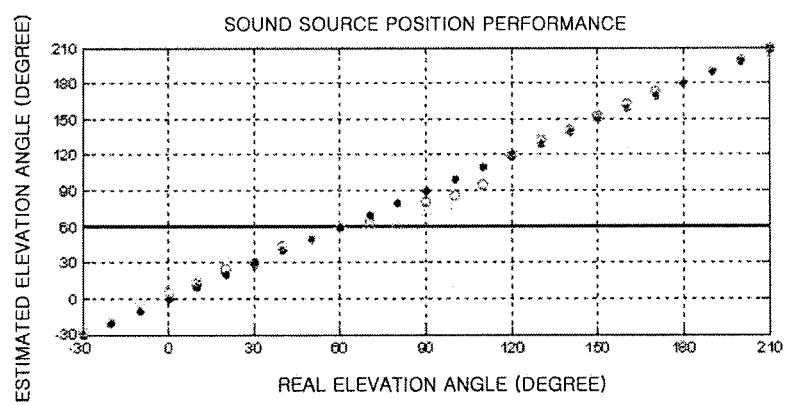
FIG. 7 is a graph showing performances of detecting the direction of a sound source using the signal having the reflected wave removed therefrom according to an embodiment of the invention.

FIG. 7 is a graph showing performances of detecting the direction of a sound source using the signal having the reflected wave removed therefrom according to an embodiment of the invention. Here, line represented by "*" shows the position of a real sound source, and line represented by "o" shows the position of an estimated sound source. Referring to FIG. 7, it can be seen that the position of the real sound source is almost identical to that of the estimated sound source.

The windowing (Hamming windowing) method using a Hamming window, proposed in this embodiment, is provided only for illustrative purposes. For example, there may be used other windowing methods for removing reflected waves, including Bartlett-Hann windowing, Bartlett windowing, Blackman windowing, Bohman windowing, Chebyshev windowing, flat-top windowing, Gaussian windowing, Hann windowing, Kaiser windowing, Nuttall windowing, Parzen windowing, Tukey windowing, rectangular windowing, triangle windowing and the like.

Hereinafter, a signal processing method for removing a reflected wave generated by a robot platform according to an embodiment will be described using mathematical expressions and figures.

It is assumed that x[n] is a signal measured at a first channel and y[n] is a signal measured at a second channel.

$$x[n]=s[n-nd_x]+r_1[n-rd_x]$$

$$y[n]=\alpha s[n-nd_y]+r_2[n-rd_y] \quad (2)$$

Here, s[n] and r[n] denote a sound source signal (direct wave) and a noise signal (reflected wave), respectively, and x[n] and y[n] denote time sequences, respectively. In the case of delay items used herein, $nd_x$ and $nd_y$ denote time delays of input and output sound source signals, respectively, and $rd_x$ and $rd_y$ denote time delays of input and output noise signals, respectively. Equation 3 is deduced by performing Z-conversion with respect to Equation 2.

$$X(z)=z^{n-nd_x}S(z)+z^{-rd_x}R_1(z)$$

$$Y(x)=\alpha z^{-nd_y}S(z)+z^{-rd_y}R_2(z) \quad (3)$$

X(z) and Y(z) denote Z-conversions of x[n] and y[n], respectively. Here, the IcTF of the Z-conversion is obtained by Equation 4.

$$IcTF(z) = \frac{Y(z)}{X(z)} = \frac{\alpha z^{-nd_y}S(z)+z^{-rd_y}R_2(z)}{z^{-nd_x}S(z)+z^{-rd_x}R_1(z)} = \frac{\alpha z^{-(nd_y-nd_x)} + z^{-(rd_y-nd_x)}\frac{R_2(z)}{S(z)}}{1+z^{-(rd_x-nd_x)}\frac{R_1(z)}{S(z)}} \quad (4)$$

When the influence of a reflected wave included in a channel signal is less than that of a direct wave included in the channel signal, $$\frac{R_1(z)}{S(z)}$$

is smaller than 1, and Equation 4 is represented by Equation 5.

$$\text{In case of } \frac{R_1(z)}{S(z)} \ll 1, \quad (5)$$

$$IcTF(z) = \alpha z^{-(nd_y-nd_x)} + z^{-(rd_y-nd_y)}\frac{R_2(z)}{S(z)}$$

In Equation 5, it can be seen that the direct wave has a delay or advance of $nd_y$-$nd_x$ and the reflected wave has a delay or advance of $rd_y$-$rd_x$. Thus, when the influence of the reflected wave is less than that of the direct wave, the direct and reflected waves are obviously differentiated from each other. Accordingly, the influence of the reflected wave can be separated from that of the direct wave through the windowing. As such, when detecting the position of the sound source, only the influence of the direct wave can be considered even in the space in which the reflected wave exists.

FIG. 8 is a flowchart illustrating the signal processing method for removing a reflected wave generated by a robot platform according to an embodiment of the invention. The signal processing method for removing a reflected wave, illustrated in FIG. 8, is provided only for illustrative purposes, and processes in the signal processing method may be performed as individual operations or in different orders. Also, the respective processes in the method are not essential processes for carrying out the signal processing method disclosed herein, and some of the processes may be omitted or replaced by other processes.

Referring to FIG. 8, in the signal processing method for removing the reflected wave, an IcTF is measured from signals of a plurality of channels (S801). The signals of the plurality of channels may be signals inputted to a plurality of microphones with difference channels. The IcTF may be converted into time domain so as to remove a reflected wave (S802). Subsequently, an IcIR is obtained by the IcTF (S803). Then, the reflected wave is removed by differentiating the reflected wave with a time delay and a direct wave directly generated from a sound source from the obtained IcIR (S804). The reflected wave may be removed using the windowing. Here, the IcIR having the reflected wave removed therefrom may be converted into frequency domain so as to be used for detecting the direction of the sound source (S805).

The signal processing apparatus and method for removing a reflected wave generated by a robot platform, disclosed herein, can be applied to the development of unified sound source direction detecting sensors by freely applying the sound source direction detecting technique to various robot platforms.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A signal processing apparatus for removing a reflected wave generated by a robot platform, comprising:
   a plurality of microphones having respective channels positioned on the robot platform;
   a transfer function measuring unit for measuring an inter-channel transfer function (IcTF) from sound signals of the plurality of channels;
   a time domain converting unit for converting the IcTF measured by the transfer function measuring unit into the time domain;
   an impulse response obtaining unit for obtaining an inter-channel impulse response (IcIR) from the IcTF converted by the time domain converting unit; and
   a reflected wave removing unit for removing the reflected wave by differentiating a direct wave directly generated by a sound source and the reflected wave with a time delay by performing windowing with respect to the IcIR obtained by the impulse response obtaining unit;
   wherein the IcTF is defined according to the formula:

$$IcTF_{FB}(f_k) = \frac{G_{FB}(f_k)}{G_{BB}(f_k)} = |IcTF(f_k)|e^{j \cdot phase(f_k)}$$

where $G_{FB}(f_k)$ denotes a cross power density function between the signals of the first and second channels, and $G_{BB}(f_k)$ denotes a power spectral density function of the signal of the second channel.

2. The signal processing apparatus according to claim 1, further comprising:
   a frequency domain converting unit for converting the IcIR having the reflected wave removed from the reflected wave removing unit into the frequency domain.

3. The signal processing apparatus according to claim 1, wherein the windowing includes any one selected from the group consisting of Bartlett-Hann windowing, Bartlett windowing, Blackman windowing, Bohman windowing, Chebyshev windowing, flat-top windowing, Gaussian windowing, Hann windowing, Kaiser windowing, Nuttall windowing, Parzen windowing, Tukey windowing, rectangular windowing and triangle windowing.

4. A signal processing method for removing a reflected wave generated by a robot platform, comprising:
   measuring, by a signal processing apparatus associated with a robot platform, an inter-channel transfer function (IcTF) from sound signals of a plurality of channels generated by a plurality of microphones position on the robot platform;
   converting, by the signal processing apparatus, the measured IcTF into the time domain;
   obtaining, by the signal processing apparatus, an inter-channel impulse response (IcIR) from the converted IcTF; and
   removing, by the signal processing apparatus, the reflected wave by differentiating a direct wave directly generated by a sound source and the reflected wave with a time delay by performing windowing with respect to the obtained IcIR;
   wherein the IcTF is defined according to the formula:

$$IcTF_{FB}(f_k) = \frac{G_{FB}(f_k)}{G_{BB}(f_k)} = |IcTF(f_k)|e^{j \cdot phase(f_k)}$$

where $G_{FB}(f_k)$ denotes a cross power density function between the signals of the first and second channels, and $G_{BB}(f_k)$ denotes a power spectral density function of the signal of the second channel.

5. The signal processing method according to claim 4, further comprising:
   converting, by the signal processing apparatus, the IcIR having the reflected wave removed into the frequency domain.

6. The signal processing method according to claim 4, wherein the windowing includes any one selected from the group consisting of Bartlett-Hann windowing, Bartlett windowing, Blackman windowing, Bohman windowing, Chebyshev windowing, flat-top windowing, Gaussian windowing, Hann windowing, Kaiser windowing, Nuttall windowing, Parzen windowing, Tukey windowing, rectangular windowing and triangle windowing.

* * * * *